Figures 1, 2, 3:
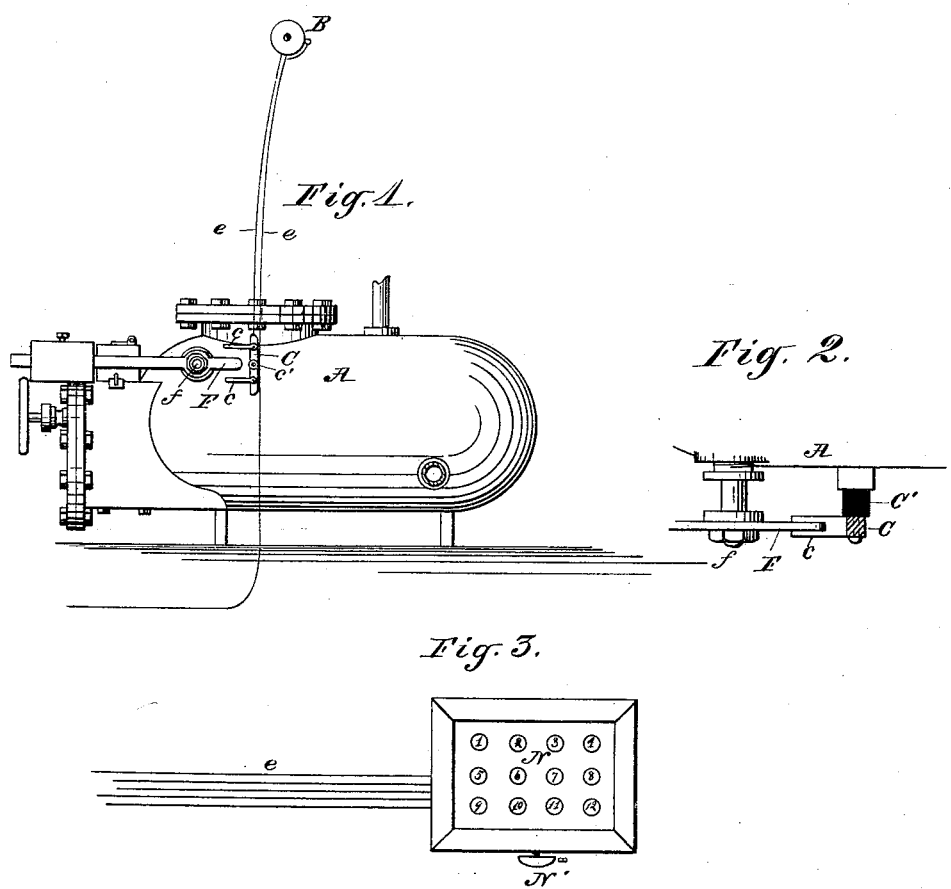

(No Model.)

E. F. OSBORNE.
STEAM HEATING APPARATUS.

No. 266,506. Patented Oct. 24, 1882.

Witnesses—
A. O. Adams
F. W. Adams

Inventor—
Eugene F. Osborne
per W. E. Duston
Attorney

UNITED STATES PATENT OFFICE.

EUGENE F. OSBORNE, OF ST. PAUL, MINNESOTA.

STEAM HEATING APPARATUS.

SPECIFICATION forming part of Letters Patent No. 266,506, dated October 24, 1882.

Application filed October 31, 1881. Renewed September 14, 1882. (No model.) Patented in France January 4, 1881, No. 140,479; in Germany January 4, 1881, No. 15,588; in Belgium January 5, 1881, No. 53,497, and in England October 17, 1882.

*To all whom it may concern:*

Be it known that I, EUGENE F. OSBORNE, of St. Paul, in the county of Ramsey and State of Minnesota, have invented certain new and useful Improvements in Steam Heating Apparatus; and I do hereby declare that the following is a full, clear, and exact description thereof, reference being had to the accompanying drawings, and to the letters of reference marked thereon, which form a part of this specification.

This invention relates to systems for supplying steam or the heat of steam from a common point to several buildings in a town or city; and it consists in connecting the several local apparatuses with a central annunciator or a corresponding number of signals grouped at a convenient point for observation, whereby derangement of either of the said local apparatuses may be promptly and automatically announced to the person in charge in order that it may be at once corrected.

My invention is herein illustrated by the application of an electric annunciator and connections to a certain form of float-trap comprised in one of the local apparatuses, said certain form of float-trap being that shown and described in another patent granted to me for which application was filed August 16, 1881.

In the drawings, Figure 1 shows the said trap in side elevation, having devices applied thereto for the purposes of this invention. Fig. 2 shows parts of the trap in plan and horizontal section, and Fig. 3 shows the annunciator, which is located at a convenient point for observation—as, for example, the generating-room, whence steam is supplied.

The float-trap is selected as the most appropriate part of the local apparatus with which to connect the signal or annunciator, for the reason that defects in the operation of the said apparatus are generally readily manifested in the position of the water-level in said trap. In the form of trap referred to, and here shown, the water-level is externally revealed by an exterior arm connected with the interior float, which arm forms a conveniently available moving or movable part by which to close an electric connection whenever the float shall rise beyond a proper limit in consequence of an obstruction of the condense-water escape from the trap, or shall fall too low from any cause that may prevent the proper supply of water to the trap.

A is a cast-iron steam-trap, having an interior float connected by a relatively-horizontal arm with a protruding metal shaft, $f$, so as to oscillate said shaft by the rise and fall of the water-level within said trap.

F is a metal arm rigidly secured to the protruding portion of the shaft $f$, and therefore vibrated with the rise and fall of the interior float.

C is a metal bar, centrally pivoted at $c'$ to the side of the trap near and opposite the vibrating arm F, as shown, and insulated from the trap by the interposed block $C'$, of hard rubber or other suitable insulating substance. Said bar C is provided with two metal arms, located one at each side of the pivotal point $c'$, and arranged to project one above and the other below the arm F, as shown in Fig. 1. Said arms $c$ are so placed that all normal movements of the arm F may take place between them without contact therewith, but also so that any extraordinary movement of said arm F, produced by too much or too little water in the float, shall bring it into contact with one or the other of the arms $c$ $c$. By then connecting the trap A, the bar C, and an annunciator with a suitable battery or its equivalent in a circuit that shall be closed by contact of the arm F with the bar C through one or the other of its arms $c$, a deranged condition or operation of the apparatus which affects the water-level of the float will be at once signaled by the annunciator. N is such an annunciator, supposed to be located at the general office, the generating-room, or other convenient point for observation by persons interested, and $e$ is an insulated wire leading from the bar C to the annunciator N. The trap or its arm F may have "ground" or other suitable connection with the annunciator, and all the appliances necessary to produce the current and to sound the alarm and all separate connections needful to indicate the number of the trap or apparatus whence the signal comes at the annunciator may be of the usual or any preferred construction. A signal-bell connected with the annunciator N is shown at N'.

B is a signal-bell, located in the building containing the trap and suitably arranged in the circuit to give warning to the persons locally in charge.

The wires $e$ may be laid in the same inclosing box which contains the mains and branches through which steam is conveyed to the building, or they may be arranged above ground, in the usual manner of telegraph-wires.

I claim as my invention—

1. In a system of general steam-supply for many buildings from a common source, the combination, with the several local apparatuses, of an annunciator located at a convenient point and connected with a moving part of each of said local apparatuses, whereby the annunciator at once indicates a derangement of either of said local apparatuses, substantially as described.

2. In a system of general steam-supply for many buildings from a common source, the combination, with the several local apparatuses, of an annunciator located at a convenient point and connected with a moving part of each of said local apparatuses, and a local signal connected with such moving part, whereby an alarm is simultaneously signaled to the occupants of the building and at the central annunciator, substantially as described.

In testimony that I claim the foregoing as my invention I affix my signature in presence of two witnesses.

EUGENE F. OSBORNE.

Witnesses:
M. E. DAYTON,
JESSE COX, Jr.